United States Patent [19]

Gillern

[11] 4,061,620

[45] Dec. 6, 1977

[54] PHENOL-FORMALDEHYDE-RESORCINOL RESINS AND ADHESIVES

[75] Inventor: Maurice F. Gillern, Seattle, Wash.

[73] Assignee: Weyerhaeuser Company, Tacoma, Wash.

[21] Appl. No.: 615,215

[22] Filed: Sept. 22, 1975

Related U.S. Application Data

[63] Continuation of Ser. No. 450,126, March 11, 1974, abandoned.

[51] Int. Cl.$^2$ ............................................. C08L 61/10
[52] U.S. Cl. .................................... 260/29.3; 260/38; 428/528; 428/541
[58] Field of Search ........................ 260/29.3, 54, 57 R

[56] References Cited

U.S. PATENT DOCUMENTS

| | | | |
|---|---|---|---|
| 2,385,373 | 9/1945 | Rhodes | 260/54 |
| 2,478,943 | 8/1949 | Rhodes | 260/54 |
| 2,614,096 | 10/1952 | Spahr | 260/54 |

*Primary Examiner*—Theodore E. Pertilla

[57] ABSTRACT

A liquid phenol-formaldehyde-resorcinol resin is made by reacting principally monomeric methylolphenols, free formaldehyde and resorcinol in an aqueous solution. The ratios of formaldehyde combined with phenol in the methylolphenols, the free formaldehyde and resorcinol are critical within given ranges. A base resin product is obtained which may be further modified in various ways to form adhesive resins. One modification involves further advancement of the base resin to increase molecular weight. When this adhesive resin is combined with an appropriate hardener, such as an aldehyde, the resulting adhesives exhibit a range of versatility previously unknown in any one product. These adhesives may be used for finger jointing wood members or for room temperature cure or preheat laminating of wood. By simply varying pH of one adhesive resin within narrow limits, a range of cure times from about a minute to well over an hour can be achieved. The resins of this invention are further characterized by excellent water washability so that organic solvents or strong alkaline solutions are not required for cleanup of equipment.

85 Claims, No Drawings

PHENOL-FORMALDEHYDE-RESORCINOL RESINS AND ADHESIVES

This is a continuation, of application Ser. No. 450,126, filed Mar. 11, 1974, now abandoned.

BACKGROUND OF THE INVENTION

This invention relates to phenol-formaldehyde-resorcinol resin compositions, to adhesives prepared therefrom, and to methods of making and using such resins and adhesives.

Many different types of phenol-formaldehyde-resorcinol resins, sometimes called PFR resins hereafter, have been known for almost 30 years. They have found wide acceptance, particularly within the forest product industry. Their excellent durability and property of curing to a thermoset state without external heat have made them especially useful in the manufacture of laminated wood products. They are also widely used in wood boat construction.

Those PFR adhesives available to date have been quite use specific. By this it is meant that an adhesive useful for radio frequency cured finger jointing or for general cold set laminating or for preheat laminating (where the surface area of the wood is heated before application of the adhesive and subsequent clamping) would not be suitable for another of those uses. A serious and expensive problem has been the lack of water washability of these adhesives. Normally when contacted with water these adhesives will curdle into a sticky, gooey mass that is then extremely difficult to remove from the surface to which they are adhering. This has necessitated the use of strong caustic solutions or organic solvents for cleanup of equipment.

These PFR resins have been made by mixing phenol and resorcinol in a suitable reaction vessel and then reacting formaldehyde with them. (U.S. Pat. No. 2,385,372 to Rhodes). PFR resins have also been made by reacting formaldehyde and phenol in one vessel and reacting formaldehyde with resorcinol in a separate vessel and then combining the two resulting reaction products. See U.S. Pat. Nos. 2,385,373 and 2,478,943 to Rhodes. It is also known to make a phenol-formaldehyde resin and then modify it with resorcinol to obtain PFR resins. One reason for this post modification by resorcinol is that the phenol-formaldehyde will become the backbone (i.e., the inner structure) of the final polymer and the resorcinol will be attached at reactive terminal positions. This is desirable because resorcinol is much more expensive than phenol but is also much more reactive. Thus, by this process the more costly resorcinol can be used most efficiently. U.S. Pat. Nos. 2,489,336 to Spahr et al, 2,614,096 to Spahr and Re. 26,881 to Kreibich et al teach generally these basic techniques.

In all of these prior patents the phenol-formaldehyde component has been a resole of moderate degree of polymerization.

U.S. Pat. No. 2,437,710 to Rhodes teaches a somewhat different approach. Among the many possible procedures which may be included under the teachings of this patent is the reaction of methylolated phenolic materials, such as o, o-dimethylol-p-cresol, with resorcinol in a nearly water free molten mass.

This invention is based on the discovery that by reacting methylolphenols with free formaldehyde and resorcinol, within certain molar ratios, an unexpectedly versatile resin product is obtained that may be further modified to form a variety of other useful resins. Among these, it has been discovered that when this particular resin is subjected to further advancement and mixed with a hardener the resulting resin composition produces an unusually versatile, durable and strong resin adhesive.

SUMMARY OF THE INVENTION

This invention is directed to PFR resin compositions which are liquid at room temperature and are made by reacting (1) a phenol-formaldehyde reaction product comprised of monomeric methylolphenols (these reaction products are sometimes referred to hereafter simply as methylolphenols or monomeric methylolphenols, (2) free formaldehyde and (3) resorcinol, in an aqueous solution, at least until substantially all the free formaldehyde is consumed. Preferably, the reaction conditions are maintained at least until the composition attains the well known characteristics of a novolac. These ingredients are present in proportions which must satisfy equations (1) and (2).

$$0.5 \leq \frac{F_c + F_f}{R + P} \leq 0.8 \quad (1)$$

where $F_c \geq 0.9P$ and $F_f \geq 0.35P$, and $$6P \geq R \geq 1.5P \quad (2)$$

wherein $F_c$ is the number of moles of formaldehyde combined in the methylolphenols, $F_f$ is the number of moles of free formaldehyde, R is the number of moles of resorcinol, and P is the number of moles of phenol.

Equation (1) states that the mole ratio of total formaldehyde ($F_c + F_f$) to total phenolic materials (R + P) must be from 0.5 to 0.8. Above the stated range the stability of the resins is poor. Resins with mole ratios of total formaldehyde to total phenolics substantially higher than 0.8 will usually gel or even cure in the reaction vessel during manufacture. It has been discovered that the combined formaldehyde in the methylolphenols must be at least 0.9P if the desirable characteristics of the adhesives are to be attained. The reasons for this are not apparent.

It is critical to the present invention to have a mole ratio of free formaldehyde to phenol of 0.35 or higher available for reaction with resorcinol in the preparation of the product described herein as "base resin". The base resin is modified further to make the ultimate adhesive resins.

The product of the present invention described as the "base resin" may be modified in a number of ways to produce adhesive resins. The adhesive resins are combined with a methylene group donor or other hardening agent to produce durable, room temperature curing bonding agents for wood or other materials. One such adhesive resin is described and claimed in commonly assigned U.S. Application Ser. No. 396,669, filed Sept. 13, 1973, which is incorporated herein by this reference.

Other adhesive resins described herein are made by further advancement (or increase in molecular size), of the base resins in order to reduce cure time and obtain adhesive resins having outstanding and unexpected properties. In particular these resins are suitable as finger joint resins for end joining wood members, and as laminating resins for either cold set or preheat application. By simply adjusting pH within fairly narrow limits a range in cure time from about a minute to well over an hour is possible. No resin presently commercially available is acceptable in more than one of the above applications and none approach the range of cure time versatility. The adhesive resins of this invention share the excellent durability to weathering that has been a characteristic of most phenol-resorcinol adhesives. They are further characterized by excellent water washability so that organic solvents or strong alkaline solutions are not required for cleanup of equipment. Free phenol content of the adhesive resins is exceptionally low.

DETAILED DESCRIPTION OF THE INVENTION

The present invention encompasses the new compositions of matter obtained by reacting in an aqueous solution (1) a phenol-formaldehyde reaction product comprised principally of monomeric methylolphenols, (2) free formaldehyde, and (3) resorcinol, and the processes of making and using them.

By the term "base resin" is meant a PFR reaction product of the above type that can be modified by the addition of other reactive chemical materials or by further polymerization to form adhesive resins.

"Adhesive resins" are those products which when admixed with a hardener or curing agent will react at room temperature to form an insoluble, thermoset product.

An "adhesive" is the combination of an adhesive resin and a hardener that can be used to bond members into a unitary structure. The term "glue" is sometimes used with the same meaning.

A "hardener" is a chemical material that will cause an adhesive resin to crosslink into an infusible product.

As outlined in the Summary of the Invention, certain ranges or ratios of ingredients are essential if the unique properties of the resins of this invention are to be achieved.

The range of the number of moles or formaldehyde, $F_c$, reacted per mole of phenol in the monomeric methylolphenols may vary within the limits of 0.9 to 3.0. It is preferred, however, that this mole ratio be from 1.2 to 2.3:1 and most preferred that it be from 1.3 to 2.0:1.

Resorcinol, R, must be from 1.5 to 6 moles of resorcinol per mole of phenol. A preferred range is 3 to 4.6 moles of resorcinol per mole of phenol and a most preferred range is from 3.5 to 4.2 moles of resorcinol per mole of phenol.

The mole ratio, Y, of total formaldehyde to total phenolics may acceptably be within the range of 0.5 to 0.8:1. It is more preferred that it be within the range of 0.65 to 0.75:1 and most preferably 0.68 to 0.74:1.

As indicated previously, free formaldehyde, $F_f$, may not be below 0.35 moles per mole of phenol. In the preferred versions of the resins it will be from 0.4 to 3.0 moles per mole of phenol and in the most preferred resins it will be from 1.1 to 2.6 moles per mole of phenol.

PREPARATION OF MONOMERIC METHYLOLPHENOLS

Monomeric methylolphenols may be any of the five possible monomeric reaction products of formaldehyde and phenol wherein hydroxymethyl (or "methylol") groups are present, or mixtures thereof. These are o-methylolphenol, p-methylolphenol, o,o-dimethylolphenol, o,p-dimethylolphenol and o,o,p-trimethylolphenol. "Principally monomeric" means that the phenol-formaldehyde reaction product used herein comprises on a weight basis, a major amount (i.e., at least 50%) of monomers but may also, and usually will, include some dimers and a minor amount of higher molecular weight polymers. Preferably, the methylolphenols comprise of least 65% by weight of monomers.

These methylol phenols can be made by any known method which prevents substantial polymerization and allows only the monomers with a minor amount of higher molecular weight products to be produced. See the hardener composition disclosed in the aforementioned Rhodes U.S. Pat. No. 2,437,710 or U.S. Pat. No. 3,284,231 to Shafizadeh as examples. As defined previously, the ratio of formaldehyde combined with phenol in these products should be from 0.9 to 3.0, preferably from 1.2 to 2.3 and more preferably from 1.3 to 2.0. Combined formaldehyde refers to formaldehyde which has been actually reacted with phenol and does not include unreacted formaldehyde mixed with the methylolphenols.

A preferred method of making the methylol phenols used in the present invention is to react formaldehyde and phenol at a temperature in the range of 20° C to 85° C and more preferably in the range of 40° C to 70° C and at a pH below 10. The low temperature and pH are preferred in order to minimize polymer formation. By this method complete water solubility will result. The formaldehyde and phenol should be reacted for a sufficient time so that most of the phenol will combine with formaldehyde and there will be very little or no free phenol remaining. It is also preferred that the reaction be carried out in an aqueous alkaline solution. Alkaline catalysts should be present in order to stop the reaction at the methylol stage. However, the amount of alkaline catalyst present should not normally be so much as to raise the pH above 10. For certain uses, especially radio frequency (RF) gluing, it is desirable to have the quantity of inorganic ions in the resin as low as possible. It is an outstanding feature of one version of the adhesive resins of this invention that it falls into a desired range of electrical conductivity with very low concentrations of inorganic ions. The reasons for this are not fully understood, however, it is in marked contrast to those resins known to the present. For whatever reason, the chemical and electrical properties of the adhesive are such that significantly reduced energy input is required for curing. Arcing tendencies are greatly reduced. For applications where the resins will not be used for RF curing higher pH levels in the preparation of the methylolphenols may be quite acceptable.

The amount of water present in the preparation of the methylolphenols is not critical but should preferably be sufficient to give a solids content between 30% and 60% by weight.

The free formaldehyde used in the preparation of the PFR resins of this invention can be, in whole or in part, unreacted formaldehyde carried over from the preparation of the methylolphenols. It can also be combined with the methylolphenols and resorcinol at the time of making the base resins of this invention. The free formaldehyde will react with resorcinol in the subsequent step to form resorcinol-formaldehyde resins. The rate of this reaction is relatively fast. On the other hand, the free formaldehyde will not show significant reaction with the methylolphenols since that reaction rate is very slow. Shelf life of a mixture of free formaldehyde and methylolated phenols is moderately good and this mixture can be stored for some time. An even more preferred procedure if the methylolphenols are to be stored for any length of time is to prepare them so as to be low in free formaldehyde. Additional free formaldehyde may then be added just prior to or at the time of the reaction with resorcinol.

The amount of free formaldehyde in the solution of methylolphenols can be determined by the well known hydroxylamine hydrochloride titration method. The combined formaldehyde $F_c$ may then be calculated by subtracting the amount of free formaldehyde from the total formaldehyde charged with the phenol.

PREPARATION OF PFR BASE RESIN

The PFR base resins of this invention are preferably prepared by adding the resorcinol to a mixture of methylolphenols and free formaldehyde. The ingredients can be combined in any order as long as the temperature is low enough that the rate of solution exceeds the rate of reaction. Otherwise, localized gelling will occur. Normally no additional catalyst is needed over and above that used in preparation of the methylolphenols. In many cases the reaction pH after the addition of resorcinol may fall slightly on the acidic side. Some heat is desirably used to initiate the reaction but this is not essential. Preferably, the reaction temperature is between 60° C and reflux.

While the exact reactions that occur are not known, it can be postulated from kinetic considerations that the initial reaction to occur is methylolation and condensation of resorcinol. After the free formaldehyde is almost completely exhausted, two additional reactions will begin to occur. These will consist of condensation between any free resorcinol remaining with methylolphenols and a parallel condensation between resorcinol-formaldehyde resins and methylolphenols. From steric considerations the first of these latter two reactions should take place at a slightly greater rate than the second, although both would be expected to take place simultaneously. Some free resorcinol may and usually will remain in the final resin. This is in no way detrimental to its performance.

It will be apparent from the foregoing that it should be possible to prepare the base resins of this invention by partly or completely reacting the free formaldehyde and resorcinol separately, then combining the product with the methylolphenols and allowing the resulting mixture to react.

The additional formaldehyde may be added prior to or immediately subsequent to the combination of resorcinol with the methylolphenols, although the former is usually preferable.

If the initial temperature at which this reaction is carried out is too high the reaction could go out of control and an explosion could result. It is therefore desirable that the mixture to which resorcinol is added be below 70° C, more preferably about 60° C. When the resorcinol starts to react with the formaldehyde and the methylolphenols an exotherm occurs which takes the temperature up to reflux (around 100°). This exotherm will usually subside after a few minutes. The product at this point is now known as the base resin.

PREPARATION OF THE ADHESIVE RESINS OF THIS INVENTION

The PFR base resin is itself a useful adhesive resin for some purposes. It is preferred, however, to further modify this product. One advantageous manner of doing this is taught in U.S. Application Ser. No. 396,669.

Another way to produce an adhesive resin is to effect advancement of the base resin or in other words to further polymerize it. This offers a number of advantages. Cure time is significantly decreased and the overall properties as an adhesive resin are generally much improved. While these properties are difficult to define, they are manifested in the great versatility of the advanced product, a characteristic not found in the unmodified base resin.

The preferred method of advancing the resin is to increase the alkalinity and/or continue cooking for a certain amount of time. A convenient way of increasing alkalinity is by addition of caustic soda until the desired pH is reached. It may be desirable to use two or more caustic additions instead of only one because better control of the viscosity of the resin mixture can thus be obtained. Alternatively, if caustic is used to advance the base resin, it can be added partially with the resorcinol during preparation of the PFR base resin.

The relative degree of advancement of the resin can be determined by combining it with a hardener composition in specific proportions and measuring the "gel time" (the time between mixing and gelation) at a given temperature.

A convenient device for measuring gel time is the Tecam gel timer available from LaPine Scientific Company, Chicago, Illinois. This is a device which alternately raises and lowers a probe within a container filled with a resin-hardner mixture. When the mixture gels and the frictional force sensed by the probe passes a certain maximum value, a timer is signaled. The timer automatically records the period from insertion of the sample to the gel point. It is essential that all parameters of the test be controlled if comparative results are to be meaningful. Unless otherwise indicated, all Tecam gel times mentioned herein were run using a 40 gm sample of mixed resin and hardener contained in a 38 × 120 mm glass test tube. That, in turn, was immersed in a 30° C water bath.

The Tecam gel test is not accurate for adhesives having very short gel times. For these it is preferred to place the adhesive mixture in a small beaker or paper cup and check manually and visually for gelation by probing with a spatula or wooden tongue depressor. The time to gelation determined by this method is referred to herein as "pot life". For a given adhesive composition and temperature the pot life determined by this method will usually be somewhat longer than the Tecam gel time.

The most preferred adhesives will have 30° C Tecam gel times in the 50 to 75 minute range when measured at pH 7.5 and with an adhesive resin solids content of 53–55%, using a ratio of 5 parts adhesive resin to 1 part of a standard hardener. The hardener used in the test consists of a mixture of 50 weight % powdered paraformaldedhyde (93–97%), 40% walnut shell flour and 10% attapulgite clay. This hardener is preferred for most of the adhesives of this invention. Unless otherwise stated, all Tecam gel times set forth in the following examples were run by the above method.

Another means of determining objectively when a desired state of advancement is reached is by measurement of viscosity, again at a given pH and solids content. At pH 7.5 and a solids content of 54% the Gardner bubble tube viscosity should preferably be between S and U at 25° C. In referring to Gardner viscosities, those expressed, for example as CD, mean that the viscosity falls between C and D. All Gardner viscosities were determined at 25° C.

The preferred objective test for measuring when the desired advancement of the base resin of this invention is reached is to use both the gel time and viscosity measurements. As a control test in the production of the resin, however, viscosity measurement is the best practical means known.

The liquid adhesive resins described above will be storage stable for at least 6 months at ambient temperatures. They will also exhibit infinite water dilutability.

ADHESIVE COMPOSITIONS

The adhesive resins of this invention, i.e., those produced by advancement of the PFR base resin, need only to be combined with a hardener in order to make a wood adhesive. Various alkylene group donors can be used as hardeners. Typical of these are formalin, paraformaldehyde, acetaldehyde, glyoxal, oxazolidine and $\alpha$-polyoxymethylene. Other materials such as di- or poly-isocyanates are also useful. Formaldehyde and its polymers are preferred. The hardener can be either in powdered or liquid form. A liquid hardener might be a suspension of solid materials which can be handled as a liquid. Such a composition is taught in the Kreibich et al U.S. Pat. No. 3,634,276.

If a powdered hardner using a methylene donor such as paraformaldehyde is used, it is usually desirable to blend the paraformaldehyde with inert materials such as wood flour, walnut shell flour, clays or other fillers. These materials help to insure rapid and uniform dispersion of the hardener in the adhesive resin.

One particularly useful inert filler is attapulgite clay. This is available from a number of commercial sources in a variety of particle size grades. Attapulgite clay is an acicular magnesium aluminum silicate having excellent gelling properties in both aqueous and organic liquid systems. As such, it is particularly useful as a thickener for viscosity control in the adhesive as well as assisting in the dispersion of the hardener. The pH which falls between 7.5 and 9.5 is also in a fortuitous range. One suitable clay sold as Attagel 50 has an average particle size of 0.14 microns. From 5% to 20% of attapulgite in the hardener seems to be a desired range.

The proportions of adhesive resin to hardener are usually those that supply a small excess of curing agent over and above that necessary to insure complete conversion to a completely infusible product insoluble in common solvents. For the powdered hardener described earlier, a ratio of 5 parts resin to 1 of hardener on a weight basis appears to be optimum. There is no inherent hazard to adhesive properties if a fairly large excess of hardener is present. An inadequate amount of hardener, however, will result in a poorly cured adhesive and weak bond. Optimum amounts of other hardener systems can be readily found by experimentation.

Other modifiers for control of viscosity and thixotropy, such as pyrogenic silica or asbestos, can also be included as minor ingredients of the adhesive composition. They can be used equally well as components of either the adhesive resin or hardener.

The final adhesive resin has many characteristics which make it an outstanding wood adhesive. It has a low inorganic ion content yet has a high electrical conductivity. With the normal 5:1 ratio of resin to powdered hardener referred to above, conductivity will be greater than 1000 $\mu$mho/cm. This high conductivity permits efficient acceptance of radio frequency energy, yet the low inorganic ion content is a major help in the prevention of arcing. In one commercial installation, 2 $\times$ 6 finger jointed boards were end joined at nearly twice the speed possible with the best previously available resorcinol adhesive specifically tailored for the application.

The same adhesive and hardener system has been used with equal success in a preheat laminating system.

One of the most outstanding qualities of the adhesive resins of this invention is the great versatility in cure speed which can be obtained merely by adjustment of pH over a relatively minor range. By changing pH of a preferred adhesive resin over the range from 7.25 to 10.4, cure times were varied from over 4½ hours to about 1 minute respectively. Very precise tailoring of cure time to the particular application for which the adhesive is intended is possible. This makes possible the assembly of finger joints in normal times without the need of any heat at all or with very greatly reduced energy input. It also makes hot platen assembly methods for finger joints an attractive alternative to the very expensive and troublesome radio frequency tunnels.

Another embodiment of the present invention that further illustrates the versatility of the resins is their effective application in "honeymoon" systems. In these systems, an adhesive resin is typically placed on one face of a joint to be bonded and a composition containing a hardener is placed on the other face. When the faces are pressed together the components intermix and react very rapidly to form a strong glue bond. The honeymoon system per se is not new (see U.S. Pat. Nos. 2,557,826, 3,426,706 and 3,518,159). Few honeymoon systems, however, have ever really been successful.

The adhesive resins of the present invention have given excellent performance in honeymoon systems. The normal way of using them is to mix a hardener, such as paraformaldehyde, with the adhesive resin as a first component. The second component comprises the same adhesive resin with caustic or other alkali added to increase the pH. Joints of normal quality have been obtained in two minutes press time using a hot platen system with the above adhesive. This is further detailed in the examples as are all of the applications previously listed.

The phenol, resorcinol, formaldehyde and other materials used in the preparation of the base resins and adhesive resins are the standard commercially available types. For some applications it is permissible to replace at least part of the phenol with m-cresol although water dilutability will suffer if an excessive amount is used in the preparation of the monomeric methylolphenols. Resorcinol may also be replaced, at least in part, with other di- or trihydroxy benzenes. Phloroglucinol is an especially effective polyhydroxy benzene for fast curing resin applications.

The free formaldehyde necessary in the preparation of the base resin may be replaced, at least in part, with other formaldehyde donors or polymers such as paraformaldehyde.

Any of the alkalis typically used as catalysts in the preparation of phenolic resins may completely or partially replace sodium hydroxide. Among these would be potassium hydroxide, sodium or potassium carbonates, etc. Sodium hydroxide is preferred because of its efficiency and low cost.

Ethanol or methanol may be used for their known functions of giving stability and control of adhesive penetration into the substrate.

In addition to their function as wood adhesives, use of the products of the present invention is contemplated in many other areas where adhesive bonding is practiced.

The following examples are set forth to illustrate more clearly the principles and practices of this invention. They are not intended to be restrictive but merely to be illustrative of the present invention. Unless otherwise stated all parts and percentages are on a weight basis.

EXAMPLE 1

A solution of methylolphenols of the present invention was made under the following conditions using this formulation.

| | | | |
|---|---|---|---|
| 91.6% Phenol | 28.36% | 1138.8 | gm |
| Water | 8.12% | 326.4 | gm |
| 1st 48.5% Formalin | 27.32% | 1097.2 | gm |
| Methanol | 2.19% | 88.0 | gm |
| 48.5% NaOH | 1.73% | 69.6 | gm |
| 90.7% Formic Acid | .79% | 32.0 | gm |
| 2nd 48.5% Formalin | 31.49% | 1264.4 | gm |
| | 100.00% | 4016.4 | gm |

The phenol, water, 1st formalin and methanol were mixed in a 4 liter resin reactor and the temperature was adjusted to 40° C. NaOH was then added to catalyze the methylolation reaction. The temperature of the reacting mixture was then raised to 65° C in 70 minutes at a uniform rate. A mild exotherm was observed above 45° C. The temperature of the mixture was held at 65° C for 105 minutes. At this point, the pH of the mixture was adjusted from about 9.0 to about 8.3 by incremental additions of formic acid. This pH adjustment reduces any tendency to form polymers. After the pH adjustment, the mixture was heated at 65° C for 3 hours. The free formaldehyde content of the reaction mixture was about 2.4%. By difference, the mole ratio of combined formaldehyde:phenol is then about 1.4:1. The 2nd formalin was then added and the resulting solution of methylolphenols and formaldehyde was cooled to 25° C and stored. The final viscosity was $A_3 A_4$ on the Gardner scale and pH was 8.1. Solids content of the resin was 38.1% and the free formaldehyde in the mixture was 17.0%. The refractive index was 1.4674 immediately before addition of the second formalin and 1.4220 afterwards.

EXAMPLE 2

The PFR base resin of the present invention was made using the solution of methylolphenols and formaldehyde from the previous example with the following formulation and conditions.

| | | | |
|---|---|---|---|
| Solution of Example 1 | 46.26% | 1341.6 | gm |
| Resorcinol | 53.74% | 1558.0 | gm |
| | 100.00% | 2899.6 | gm |

The solution of Example 1 was added to a 4 liter resin reactor and was heated to 60° C with agitation. At this temperature, the resorcinol was added. An endotherm occurred and the temperature of the mixture dropped approximately 24° C. The mixture was reheated to 60° C and around that temperature an exotherm occurred which with intermittent cooling carried the mixture to reflux (104°–105° C) in 5½ minutes. The reacting mixture was held at reflux until the exotherm had stopped (3–5 minutes). The Gardner viscosity was TU and the pH was 5.5. At this point the base resin may be cooled for storage. Alternatively further reaction to form an adhesive resin may be carried on immediately as shown in Application Ser. No. 396,669. This base resin also may be advanced as is shown in the following example.

EXAMPLE 3

In this case the base resin of Example 2 was not cooled for storage but held at reflux temperature. The following formulation and procedure was used from this point.

| | | |
|---|---|---|
| Base Resin | 72.49% | 2899.6 gm |
| 1st Water | 13.35% | 534.0 gm |
| 1st 50% NaOH | 1.05% | 42.0 gm |
| 2nd Water | 8.94% | 357.6 gm |
| Ethanol | 3.97% | 158.8 gm |
| 2nd 50% NaOH | 0.20% | 8.0 gm |
| | 100.00% | 4000.0 gm |

The 1st water was added to the slightly cooled reaction mixture resulting in a further temperature drop to 89.5° C. Gardner viscosity at this point was DE and pH was 5.5. Tecam gel time using five parts of resin to one part of the powdered hardener of the following example was 710 minutes. It was heated back to reflux (102°–103° C) and held for 1 hour. Gardner viscosity had increased to XY and Tecam gel time was 201 minutes. The mixture was then cooled to 90°–95° C and the 1st NaOH added. Viscosity almost immediately rose to YZ. The pH was 7.4 and 30° C gel time, 96 minutes. The mixture was then heated back to reflux (102°–103° C) and advanced to a $Z_2 Z_3$ Gardner viscosity with an additional 15-20 minute heating.

The resin was then cooled to 60° C and the second water and ethanol were added to adjust the viscosity to RS on the Gardner scale and to adjust the flow characteristics of the adhesive resin. The 2nd NaOH was added to adjust the pH to 7.5. The resin had a solids content of 53.4% and a Tecam gel time of 79 minutes.

The ratio of total formaldehyde to total phenolics was 0.72:1 and the ratio of resorcinol to phenol was 3.81:1. Examples 1 to 3 describe the preferred embodiments of the present invention.

EXAMPLE 4

The resin of Example 3 can be used with either powdered or liquid hardener compositions in order to make the final adhesive. The formulas for preferred powdered and liquid hardeners are shown below.

| Powdered Hardener | |
|---|---|
| Walnut shell flour | 40.00% |
| Attagel 50 | 10.00% |
| Paraformaldehyde powder | 50.00% |
| | 100.00% |
| Liquid Hardener | |
| Ethanolic paraformaldehyde (50% formaldehyde) | 82.13% |
| Walnut shell flour | 9.66% |
| Attagel 50 | 4.83% |
| Cab-O-Sil M-5 | 3.38% |
| | 100.00% |

The usual ratio of PFR resin to powdered hardener will be 5:1 while the ratio of resin to liquid hardener may vary from 1 part of hardener to 2 of resin to 1 part of hardener to 4 of resin, depending on the cure speed desired. Cab-O-Sil is a pyrogenic silica sold by Cabot Corp., Boston, Massachusetts. Attagel is an attapulgite clay sold by Minerals & chemicals Division of Engelhard Minerals & Chemicals Corp., Menlo Park, New Jersey. The ethanolic paraformaldehyde was made as follows:

| | |
|---|---|
| Ethanol | 36.37% |
| Methanol | 6.90% |
| NaOH 50% | 0.10% |
| Paraformaldehyde (91-95%) | 56.63% |
| | 100.00% |

The paraformaldehyde was added to a mixture of the ethanol, methanol and caustic with agitation. This mixture was rapidly heated to reflux temperature (about 99° C) and refluxed with continuing agitation. It was cooled to 25° C, filtered and stored. The pH of the hardener was 7.6.

EXAMPLE 5

This example shows how cure time of an adhesive resin made as described in Example 3 can be varied over a wide range. Amounts of 50% sodium hydroxide were added to the resin and thoroughly mixed. After each caustic addition, one part of the powdered hardener of Example 4 was mixed with 5 parts by weight of the caustic-resin mixture and the pot life at 25° C was measured. Pot life will correlate closely with cure time of a glue joint.

| Resin | Caustic Solution in Mixture, % | 25° C Pot Life, Minutes |
|---|---|---|
| 1 | 0 | 220 |
| 2 | 1.60* | 46 |
| 3 | 2.06 | 39 |
| 4 | 2.56 | 33 |
| 5 | 3.06 | 29 |
| 6 | 9.01 | 9 |

*This mixture comprises 98.40% adhesive resin and 1.60% of 50% NaOH.

It can be seen from the above that pot life and thus cure time correlates closely with alkalinity of the resin mixture, with the more alkaline resins curing fastest. The cure speed can also be expressed as a function of pH as shown in the following table. The pH was adjusted as above by adding 50% NaOH to an adhesive resin prepared as in Example 3.

| pH | 25° C Pot Life, Minutes |
|---|---|
| 7.41 | 138 |
| 7.99 | 55 |
| 8.42 | 27 |
| 8.85 | 11 |
| 9.61 | 7 |
| 10.49 | 1.1 |

Pot life in this example was determined by placing 30 gm of the resin-hardener mixture in a 6 ounce paper cup and periodically probing with a wooden tongue blade until gelation occurred.

EXAMPLE 6

This example shows the effect of different types and ratios of hardeners on the pot life of two faster curing adhesive resin systems. An adhesive resin prepared as described in Example 3 was mixed with additional 50% NaOH solution and pyrogenic silica as follows:

| Resin No. | Example 3 Resin, % | 50% NaOH, % | Pyrogenic Silica, % |
|---|---|---|---|
| 1 | 88.35 | 8.75 | 2.90 |
| 2 | 95.20 | 2.00 | 2.80 |

The pyrogenic silica was added to give the resin increased thixotropy so that it could be spread on vertical surfaces without dripping or sagging.

The hardeners used with the above adhesive resin mixtures were (A) the powdered hardener of Example 4, (B) powdered paraformaldehyde, (C) the liquid hardener of Example 4, and (D) the ethanolic paraformaldehyde solution of Example 4. Pot life at 25° C was determined on the resin-hardener compositions as shown in Table 1.

Table 1

| Resin No. | Ratio Resin/ Hardener | 25° C Pot Life, Minutes | | | |
|---|---|---|---|---|---|
| | | Hardener A | Hardener B | Hardener C | Hardener D |
| 1 | 5 | 10.8 | 6.6 | — | — |
| | 4 | — | — | 2.9 | 5.5 |
| | 3 | — | — | 1.7 | 3.5 |
| | 2 | — | — | 1.4 | 3.0 |
| 2 | 5 | 62 | 31 | — | — |
| | 4 | — | — | 10.6 | 23.5 |
| | 3 | — | — | 8.6 | 21.0 |
| | 2 | — | — | 7.6 | 19.8 |

It can be seen from the above data that for a given hardener type there is relatively little difference in cure time observed over rather wide variations of hardener usage. The liquid hardeners, however, appear to effect faster cures than the powdered.

EXAMPLE 7

The procedure for making the solution of methylolphenols as set forth in Example 1 was repeated except that in the present example all of the formaldehyde was added at the beginning of the process rather than in two steps. Otherwise, the cooking procedure was identical. The final viscosity of the methylolphenol solution was $A_2 A_3$ on the Gardner scale. Free formaldehyde was 11.91% and solids content 42.37%. Refractive index of the final product was 1.4505.

EXAMPLE 8

The procedure for making the solution of methylolphenols as set forth in Example 1 was modified in that the maximum temperature during preparation was raised from 65° C to 82° C. The temperature was raised to 82° C in 70 minutes but maintained at this level for only an additional 10 minutes until the formic acid was added to reduce the pH. This shorter time was chosen on the basis of the refractive index of the reacting mixture. Refractive index is believed to correlate with the chemical composition of the reaction mixture. The composition of Example 1 had attained a refractive index of 1.467 at the time of addition of formic acid which was 105 minutes after the temperature reached 65° C. This same refractive index was reached in only 10 minutes after the 82° C temperature was attained in the present cook. After reduction of pH to 8.3 the cook was continued for 3 hours at 82° C. The refractive index immediately prior to addition of the final formalin was 1.4775. Afterwards, Gardner viscosity was $A_2$, the pH was 8.0, refractive index was 1.4480, free formaldehyde was 16.65% and solids content was 40.7%. This material when diluted with about 25 volumes of water showed some cloudiness. This indicates very slightly poorer solubility than the compositions of Examples 1 and 7, which were infinitely dilutable without showing cloudiness.

EXAMPLE 9

The methylolphenol solutions of Examples 1, 7 and 8 were examined by liquid-solid chromatography in an attempt to determine monomers, dimers and higher molecular weight species. The solvent was an aqueous solution 0.025M in both $Na_2CO_3$ and $NaHCO_3$. A strong cation exchange resin medium was used in the column. Aromatics were determined by a U.V. detector at a wave length of 254 nm. Compounds used as models were o- and p-methylolphenol, 2,2′-dihydroxydiphenylmethane and 4,4′-dihydroxy-3,3′,5,5′-tetramethyloldiphenylmethane. Polymer content of the samples is an estimate.

These tests, as shown in Table 2, confirm expectations from prior experience and from literature descriptions. They are also consistent with infrared and nuclear magnetic resonance spectrometer analyses.

Table 2

| Methyl-olphenol Solution | Cook-ing Temp. | Formalde-hyde Additions | Mono-mers | Dimers Prob. Min. | Dimers Prob. Max. | Est. Poly-mer |
|---|---|---|---|---|---|---|
| Example 1 | 65° C | 2 | ≧80% | 4% | 20% | trace |
| Example 7 | 65 | 1 | <80% | 7 | 33 | trace |
| Example 8 | 82 | 2 | <80% | 4 | 30 | some |

EXAMPLE 10

The procedure of Examples 1 and 8 was repeated except that the maximum temperature was 98°–100° C. Within 30 minutes after the addition of formic acid the mixture had separated into an aqueous phase and a resinous phase indicating that substantial polymerization was occurring. After an additional 2 hours of cooking gelation occurred. This preparation would not be a suitable monomer mixture for the present invention.

EXAMPLE 11

The methylolphenol solutions of Examples 7 and 8 were further reacted with resorcinol by the method of Examples 2 and 3. A third cook using the methylolphenol solution of Example 1 was run at the same time as a control. Results of these resin preparations are shown in Table 3. The cooking temperatures were indentical to those of Examples 2 and 3. Minor adjustments in cooking time were made, however, due to the slightly different advancement characteristics of the resins (see Table 3). These cooks were made using a 1 liter reactor and maximum batch size of 1000 gms.

EXAMPLE 12

The three PFR resins of Example 11 were tested for their wood bonding capabilities by the industry standard method of the American Institute of Timber Construction Test No. 110. Briefly, this involves gluing two Douglas fir boards having a glue spread on one surface of 70 lbs./1000 sq. ft., 20 minutes open assembly time and 11 hours clamp time. Five shear blocks are cut from the glued assembly. Three of these are subjected to a treatment that involves full immersion under water for 30 minutes at 26 inches vacuum followed by a pressure treatment at 150 psi for 2 hours. The blocks are dried for 16 hours at 140° F and then tested for shear strength and wood failure. The other two blocks from the original laminate are sheared dry. Results are included in Table 3.

Table 3

| | Reaction Conditions and Properties | | |
|---|---|---|---|
| Methylolphenol solution of | Example 1 | Example 7 | Example 8 |
| Time to reflux after addition of resorcinol | 10 min. | 15 min. | 10 min. |
| Time at reflux before 1st water addition | 5 min. | 30 sec. | 5 min. |
| Time before addition of 1st NaOH | 1 hour | 1 hour | 30 min. |
| Gardner Viscosity before NaOH | — | — | ST |
| Heating time after addition of 1st NaOH | 20 min. | 35 min. | 30 min. |
| Viscosity before 2nd NaOH addition | $Z_1 Z_2$ | $Z_2 Z_3$ | $Z_1 Z_2$ |
| Final Viscosity | S | U | ST |
| Solids, % | 54.3 | 53.5 | 53.9 |
| pH | 7.54 | 7.45 | 7.49 |
| 30° C Tecam Gel Time | 68.9 min. | 63.9 min. | 67.7 min. |
| Refractive Index at 25° C | 1.4826 | 1.4826 | 1.4836 |
| Specific Conductance, μ mhos/cm | 1552 | 1766 | 1564 |
| AITC 110 Dry Shear Strength (psi/% Wood Failure) | 1250/88 | 1335/91 | 1250/94 |
| AITC 110 Wet Shear Strength (psi/% Wood Failure) | 1110/91 | 750/92 | 970/95 |

AITC 110 Accepts dry shear strengths of 1100 psi, wet shear strengths of 720 psi and wood failure of 80%.

EXAMPLE 13

Phenol-resorcinol resins having mole ratios of formaldehyde:total phenols (phenol plus resorcinol) greater than 0.8 have long been considered as unstable. In order to determine the stability point of the products of this invention a series of resins was made having different mole ratios of formaldehyde:total phenolics.

The solution of methylolphenols of Example 1 was used as a starting material and differing amounts of resorcinol were added. These resins were then cooked as much as possible by the procedures of Examples 2 and 3. Table 4 summarizes this set of experiments.

Table 4

| Sample No. | Mole Ratio R/P | $(F_c + F_f)/(R + P)$ | Results |
|---|---|---|---|
| 1 | 0.5 | 1.96 | Gelled in reactor |
| 2 | 1.5 | 1.16 | Gelled in reactor |
| 3 | 2.5 | 0.89 | Gelled in reactor |
| 4 | 3.0 | 0.81 | Stable |

Sample No. 4 above appeared to be on the borderline as far as stability. Due to rapid viscosity build-up, it was refluxed only 2 minutes before the addition of the first NaOH and 13 minutes before addition of the second NaOH. Final viscosity was ST and pH 7.3. The Tecam gel time at 30° C was 70.1 minutes.

EXAMPLE 14

An adhesive resin having a higher solids content than that of Examples 2 and 3 was made as follows:

| | | |
|---|---|---|
| Methylolphenols of Example 1 | 37.29 | weight % |
| Resorcinol | 43.28 | |
| Water | 13.14 | |
| Ethanol | 4.90 | |
| 50% NaOH | 1.39 | |

-continued 100.00%

The methylolphenols were charged into a 4 liter reactor and heated to 60° C with agitation. The resorcinol was added and a drop in temperature to about 30° C pressure between platens above and below the joint. Platen pressure was light and merely sufficient to prevent buckling. The platens were used cold for assembly of some samples and heated to 325° F for others. After two minutes, the pressure was released and the finger joints removed. Joints were then broken at various times to determine the rate of strength build-up.

Table 5

| System Number | Adhesive Resin of Ex. 3, % | Adhesive Resin of Ex. 14, % | 50% NaOH, % | 100% NaOH, % | Pyrogenic Silica, % | Pot Life at 25° C 1:1 Ratio of "A" & "B" Components* |
|---|---|---|---|---|---|---|
| 1 | 73.87 | — | 24.63 | — | 1.50 | 8′ 45″ |
| 2 | 78.80 | — | 19.70 | — | 1.50 | 14′ |
| 3 | 83.72 | — | 14.78 | — | 1.50 | 38′ |
| 4 | 88.65 | — | 9.85 | — | 1.50 | 71′ |
| 5 | 90.40 | — | — | 7.98 | 1.62 | 13′ 37″ |
| 6 | 85 | — | — | 15 | — | 6′ 20″ |
| 7 | 80 | — | — | 20 | — | 2′ 25″ |
| 8 | — | 73.87 | 24.63 | — | 1.50 | 7′ |
| 9 | — | 83.72 | 14.78 | — | 1.50 | 35′ |
| 10 | — | 90.40 | — | 7.98 | 1.62 | 25′ 45″ |

*The "B" component is a 5:1 mixture of the adhesive resin of Example 3 and powdered paraformaldehyde.

was noted. The reacting mixture was brought back to 55° C by application of heat. At that temperature, an exotherm began. Intermittent cooling was applied and the temperature reached reflux (103.5° C) in 11 minutes. After the exotherm had stopped, the mixture was cooled slightly and the water was added. Heating was resumed and continued at reflux for 1 hour. The resin was cooled to 60° C and the ethanol and 50% caustic were added. After thorough mixing, the resin was cooled to 25° C and stored. The pH of the resin was 7.25, the solids content 58.0% and the Gardner viscosity was TU.

EXAMPLE 15

The resins of this invention are particularly well suited for use in so-called honeymoon gluing systems. This type of system is a useful approach when pot life of the ultimate adhesive is so short that there would not otherwise be adequate time for mixing and application of the adhesive and assembly of the joint.

A number of "A" or first components of a honeymoon adhesive were made by mixing a portion of the adhesive resin of Examples 3 or 14 with either 50% or 100% NaOH to increase the alkalinity. In some of the A components, pyrogenic silica was added to control sagging. The 100% caustic is desirable in some versions to minimize the water being added to the resin and thus maintain solids at a high value.

The "B" component was made by combining 5 parts of the resin of Example 3 with 1 part of powdered paraformaldehyde.

One part each of the A and B components was mixed and the 25° C pot life measured. While this does not correlate exactly with the cure time observed when the same two components are used in a honeymoon system, it represents a close approximation.

Table 5 shows a number of honeymoon systems of this invention having a wide variability in 25° C pot life.

EXAMPLE 16

Conventional finger joints were cut vertically in 2×6 Douglas-fir dimension lumber. One-half of a joint was brush-coated with the A component of the honeymoon system and the other half of the joint was coated with the B component of the system. Coating weight was sufficient to give very light squeezeout of glue on assembly. The joints were assembled under 400 psi end For comparison, finger joints were also prepared using two other adhesives of this invention which are not honeymoon systems.

The adhesive systems used were as follows: (A) a 5:1 weight ratio mixture of fast curing resin No. 1 and hardener A, both of Example 6; (B) a 1:1 mixture of honeymoon "A" component No. 9 of Table 5 and "B" component of Example 15; and (C) a 5:1 mixture of the resin of Example 3 and the standard powdered hardener of Example 4 (identical with hardener A of Example 6). The property examined was flexural strength, the joints being broken with the fingers oriented vertically (force being applied parallel to the finger surfaces). Results are shown in Table 6.

It can be seen that the initial strength build-up is much faster in the joints assembled using hot platens. For the joints assembled cold, the rate of strength build-up is seen to be significantly higher using systems A and B.

Table 6

| Adhesive Systems | Cold Platens | | 325° F Platens | |
|---|---|---|---|---|
| | Time After Assembly | Strength, psi | Time After Assembly | Strength, psi |
| A | 30 min. | 900 | 3 min. | 5,000 |
| | 75 min. | 5,900 | 10 min. | 7,000 |
| | 120 min. | 8,600 | 40 min. | 8,400 |
| | 24 hrs. | 10,000 | 24 hrs. | 10,200 |
| B | 60 min. | 300 | 3 min. | 3,000 |
| | 90 min. | 1,500 | 20 min. | 4,900 |
| | 120 min. | 2,600 | 60 min. | 5,100 |
| | 180 min. | 6,600 | 240 min. | 5,300 |
| | 240 min. | 9,100 | 24 hrs. | 8,600 |
| | 24 hrs. | 10,800 | | |
| C | 180 min. | 3,000 | 3 min. | 3,300 |
| | 240 min. | 3,100 | 60 min. | 5,300 |
| | 480 min. | 5,800 | 240 min. | 6,200 |
| | 24 hrs. | 6,900 | 24 hrs. | 8,700 |

EXAMPLE 17

An adhesive resin mixture was made using a mixture of 96.94% of a resin made as described in Example 3 and 3.06% of 50% NaOH. This was mixed in a 5:1 ratio with the powdered hardener of Example 4 to form an adhesive. Pot life of this adhesive was 29 minutes at 25° C.

The above adhesive was used in a continuous preheat laminating operation to bond a 3/4×6 ponderosa pine face to a 2×6 Douglas-fir core in order to form a twoply laminate. Each of the surfaces to be bonded was heated by infrared radiation prior to application of the adhesive. After the adhesive was spread, the laminae were assembled and run through a continuous steel belt press at about 150 psi with less than 60 seconds' total retention time. The heat retained within the surface volume of the wood was sufficient to give adequate cure of the adhesive in this period of time so as to permit normal handling at the offbearing end of the press. Total energy input to the infrared units was only about 2/3 of that required when the commercially available adhesive normally used in the operation was employed. Ponderosa pine is known as a wood that is difficult to glue.

Bond strength data are presented in Table 7.

Table 7

| Line Speed | Dry Shear | | AITC Wet Shear | | % Delamination |
|---|---|---|---|---|---|
| | psi | % W.F. | psi | % W.F.* | |
| 60 fpm | 1,350 | 92 | 1,030 | 81 | 5.5 |
| 70 fpm | 950 | 74 | 1,120 | 82 | 12.7 |
| 80 fpm | 1,050 | 89 | 860 | 66 | 9.8 |

*Wood failure

The percentage of delamination is another measurement described in the AITC 110 test. It consists of the same vacuum-pressure-drying cycle used for shear blocks. Here, however, the percentage of glue line delamination is estimated by probing the ends of the blocks.

EXAMPLE 18

An adhesive resin made as described in Example 3 was mixed with the hardener of Example 4 in a 5:1 ratio and used as the adhesive for bonding Douglas-fir and ponderosa pine finger joints. Finger joints were cut in a direction normal to the widest dimension of the stock. Adhesive was applied by a commercial applicator in a quantity sufficient to give slight squeeze-out after joint assembly. Only one of the surfaces being bonded was spread with adhesive. The finger joints were assembled on commercial equipment and run through a radio frequency curing tunnel. Table 8 shows the results of tests on joint strength for these runs.

Long-term operating data have shown a very significant reduction in the radio frequency power required to achieve satisfactory bond strength when the above adhesive is compared with the best commercially available PFR adhesive for this application.

What is claimed is:

1. A liquid, water dilutable, phenolformaldehyde-resorcinol resin composition produced by reacting in an aqueous solution (1) a phenol-formaldehyde reaction product comprised of at least 65% monomeric methylolphenols, (2) free formaldehyde, and (3) resorcinol at least until essentially all free formaldehyde is consumed, the molar quantities of combined formaldehyde, $F_c$, and phenol, P, in said reaction product, and the molar quantities of free formaldehyde, $F_f$ and resorcinol, R, satisfying the equation $$0.5 \leq \frac{F_c + F_f}{R + P} \leq 0.8$$

wherein $F_c \geq 0.9P$, $F_f \geq 0.35P$ and $6P \geq R \geq 1.5P$.

2. The composition of claim 1 wherein $$\frac{F_c + F_f}{R + P}$$

is from 0.65 to 0.75.

3. The composition of claim 2 wherein $F_c$ is from 1.2P to 2.3P.

4. The composition of claim 3 wherein $F_f$ is from 0.4P to 3.0P.

5. The composition of claim 4 wherein R is from 3.0P to 4.6P.

6. The composition of claim 1 wherein $$\frac{F_c + F_f}{R + P}$$

is from 0.68 to 0.74.

7. The composition of claim 6 wherein $F_c$ is from 1.3P to 2.0P.

8. The composition of claim 7 wherein $F_f$ is from 1.1P to 2.6P.

9. The composition of claim 8 wherein R is from 3.5P to 4.2P.

10. The composition of claim 1 wherein $F_c$ is from 1.2P to 2.3P.

11. The composition of claim 1 wherein $F_c$ is from 1.3P to 2.0P.

12. The composition of claim 1 wherein $F_f$ is from 0.4P to 3.0P.

13. The composition of claim 12 wherein R is from 3.0P to 4.6P.

14. The composition of claim 12 wherein R is from 3.5P to 4.2P.

Table 8

| Construction | Speed Through RF Tunnel, fpm | Flexural Strength (31.5" Span) | | | | Dry Tensile | | % Delamination |
|---|---|---|---|---|---|---|---|---|
| | | Flatwise(1) | | Edgewise(2) | | | | |
| | | psi | WF, % | psi | WF, % | psi | WF, % | |
| 2×4 Douglas-fir | 65–70 | 6,540 | 87 | 9,020 | 94 | 6,080 | 99 | 0.7 |
| 2×4 Douglas-fir (long pieces) | 85–90 | 6,720 | 86 | 7,670 | 85 | 6.020 | 98 | 4.0 |
| 2×4 Ponderosa Pine | 40 | 5,160 | 100 | 6,880 | 99 | 3,920 | 100 | 0.2 |
| 2×6 Douglas-fir | 60 | 7,290 | 80 | 8,460 | 85 | 6,810 | 88 | 1.4 |
| 2×8 Douglas-fir | 40 | 6,150 | 87 | 5,840 | 96 | 6,250 | 75 | 14.4(3) |
| 2×12 Douglas-fir | 30–40 | 6,770 | 82 | 7,620 | 94 | 6,360 | 91 | 0.3 |

(1)Force applied perpendicular to the faces of the fingers.
(2)Force applied parallel to the faces of the fingers.
(3)This sample had bad end gaps due to low end pressure.

15. The composition of claim 1 wherein $F_f$ is from 1.1P to 2.6P.

16. The composition of claim 15 wherein R is from 3.0P to 4.6P.

17. The composition of claim 15 wherein R is from 3.5P to 4.2P.

18. The composition of claim 1 wherein R is from 3.0P to 4.6P.

19. The composition of claim 1 wherein R is from 3.5P to 4.2P.

20. The composition of claim 1 wherein said phenol-formaldehyde reaction product is prepared by reacting formaldehyde and phenol in an aqueous alkaline solution at a temperature of less than 85° C and at a pH below 10.

21. The composition of claim 20 wherein $F_c$ is from 1.2P to 2.3P.

22. The composition of claim 20 wherein $F_c$ is from 1.3P to 2.0P.

23. The composition of claim 20 wherein said temperature is from 40°–70° C.

24. The composition of claim 1 wherein the reaction temperature is from 60° C to the reflux temperature of said solution.

25. The composition of claim 24 wherein said reaction temperature is maintained for at least one hour.

26. The composition of claim 1 wherein said reaction conditions are maintained for a time such that the composition at a pH of 7.5 and a solids content of about 54% exhibits a Gardner viscosity of from S to U at 25° C.

27. A liquid adhesive comprising:
   a. a liquid, water dilutable, phenol-formaldehyde-resorcinol resin composition produced by reacting in an aqueous solution (1) a phenol-formaldehyde reaction product comprised of at least 65% monomeric methylolphenols, (2) free formaldehyde, and (3) resorcinol at least until essentially all free formaldehyde is consumed, the molar quantities of combined formaldehyde, $F_c$, and phenol, P, in said reaction product, and the molar quantities of free formaldehyde, $F_f$, and resorcinol, R, satisfying the equation $$0.5 \leq \frac{F_c + F_f}{R + P} \leq 0.8$$

wherein $F_c \geq 0.9P$, $F_f \geq 0.35P$ and $6P \geq R \geq 1.5P$; and
   b. a curing agent reactable with said resin composition, the amounts of said resin composition and curing agent being sufficient to cause said adhesive to become insoluble and infusible.

28. The adhesive of claim 27 wherein $$\frac{F_c + F_f}{R + P}$$

is from 0.65 to 0.75.

29. The adhesive of claim 28 wherein $F_c$ is from 1.2P to 2.3P.

30. The adhesive of claim 29 where $F_f$ is from 0.4P to 3.0P.

31. The adhesive of claim 30 wherein R is from 3.0P to 4.6P.

32. The adhesive of claim 27 wherein $$\frac{F_c + F_f}{R + P}$$

is from 0.68 to 0.74.

33. The adhesive of claim 32 wherein $F_c$ is from 1.3P to 2.0P.

34. The adhesive of claim 33 wherein $F_f$ is from 1.1P to 2.6P.

35. The adhesive of claim 34 wherein R is from 3.5P to 4.2P.

36. The adhesive of claim 27 wherein $F_c$ is from 1.2P to 2.3P.

37. The adhesive of claim 27 wherein $F_c$ is from 1.3P to 2.0P.

38. The adhesive of claim 27 wherein $F_f$ is from 0.4P to 3.0P.

39. The adhesive of claim 38 wherein R is from 3.0P to 4.6P.

40. The adhesive of claim 38 wherein R is from 3.5P to 4.2P.

41. The adhesive of claim 27 wherein $F_f$ is from 1.1P to 2.6P.

42. The adhesive of claim 41 wherein R is from 3.0P to 4.6P.

43. The adhesive of claim 41 wherein R is from 3.5P to 4.2P.

44. The adhesive of claim 27 wherein R is from 3.0P to 4.6P.

45. The adhesive of claim 27 wherein R is from 3.5P to 4.2P.

46. The adhesive of claim 27 wherein said phenol-formaldehyde reaction product is prepared by reacting formaldehyde and phenol in an aqueous alkaline solution at a temperature of less than 85° C and at a pH below 10.

47. The adhesive of claim 46 wherein $F_c$ is from 1.2P to 2.3P.

48. The adhesive of claim 46 wherein $F_c$ is from 1.3P to 2.0P.

49. The adhesive of claim 46 wherein said temperature is from 40°–70° C.

50. The adhesive of claim 27 wherein the reaction temperature is from 60° C to the reflux temperature of said solution.

51. The adhesive of claim 50 wherein said reaction temperature is maintained for at least 1 hour.

52. The adhesive of claim 27 wherein said curing agent comprises an alkylene group donor.

53. The adhesive of claim 52 wherein said alkylene group donor comprises formaldehyde or a polymer thereof.

54. A process for producing a liquid, water-dilutable, phenol-formaldehyde-resorcinol resin composition comprising reacting in an aqueous solution (1) a phenol-formaldehyde reaction product comprised of at least 65% monomeric methylolphenols, (2) free formaldehyde, and (3) resorcinol at least until essentially all free formaldehyde is consumed, the molar quantities of combined formaldehyde, $F_c$, and phenol, P, in said reaction product, and the molar quantities of free formaldehyde, $F_f$, and resorcinol, R, satisfying the equation $$0.5 \leq \frac{F_c + F_f}{R + P} \leq 0.8$$

wherein $F_c \geq 0.9P$, $F_f \geq 0.35P$ and $6P \geq R \geq 1.5P$.

55. The process of claim 54 wherein $$\frac{F_c + F_f}{R + P}$$

is from 0.65 to 0.75.

56. The process of claim 55 wherein $F_c$ is from 1.2P to 2.3P.

57. The process of claim 56 wherein $F_f$ is from 0.4P to 3.0P.

58. The process of claim 57 wherein R is from 3.0P to 4.6P.

59. The process of claim 54 wherein $$\frac{F_c + F_f}{R + P}$$

is from 0.68 to 0.74.

60. The process of claim 59 wherein $F_c$ is from 1.3P to 2.0P.

61. The process of claim 60 wherein $F_f$ is from 1.1P to 2.6P.

62. The process of claim 61 wherein R is from 3.5P to 4.2P.

63. The process of claim 54 wherein $F_c$ is from 1.2P to 2.3P.

64. The process of claim 54 wherein $F_c$ is from 1.3P to 2.0P.

65. The process of claim 54 wherein $F_f$ is from 0.4P to 3.0P.

66. The process of claim 65 wherein R is from 3.0P to 4.6P.

67. The process of claim 65 wherein R is from 3.5P to 4.2P.

68. The process of claim 54 wherein $F_f$ is from 1.1P to 2.6P.

69. The process of claim 68 wherein R is from 3.0P to 4.6P.

70. The process of claim 68 wherein R is from 3.5P to 4.2P.

71. The process of claim 54 wherein R is from 3.0P to 4.6P.

72. The process of claim 54 wherein R is from 3.5P to 4.2P.

73. The process of claim 54 wherein said phenol-formaldehyde reaction product is prepared by reacting formaldehyde and phenol in an aqueous alkaline solution at a temperature of less than 85° C and at a pH below 10.

74. The process of claim 73 wherein $F_c$ is from 1.2P to 2.3P.

75. The process of claim 73 wherein $F_c$ is from 1.3P to 2.0P.

76. The process of claim 73 wherein said temperature is from 40°–70° C.

77. The process of claim 54 wherein the reaction temperature is from 60° C to the reflux temperature of said solution.

78. The process of claim 77 wherein said reaction temperature is maintained for at least one hour.

79. The process of claim 54 wherein said reaction conditions are maintained for a time such that the composition at a pH of 7.5 and a solids content of about 54% exhibits a Gardner viscosity of from S to U at 25° C.

80. The process of claim 54 further combining a curing agent reactable with said resin composition, the amounts of said resin composition and curing agent being sufficient to cause said adhesive to become insoluble and infusible.

81. The process of claim 80 wherein $$\frac{F_c + F_f}{R + P}$$

is from 0.68 to 0.74.

82. The process of claim 80 wherein $F_c$ is from 1.3P to 2.0P.

83. The process of claim 80 wherein $F_f$ is from 1.1P to 2.6P.

84. The process of claim 80 wherein R is from 3.5P to 4.2P.

85. The process of claim 80 wherein the curing agent comprises formaldehyde or a polymer thereof.

* * * * *

UNITED STATES PATENT OFFICE
CERTIFICATE OF CORRECTION

PATENT NO. : 4,061,620
DATED : December 6, 1977
INVENTOR(S) : MAURICE F. GILLERN It is certified that error appears in the above-identified patent and that said Letters Patent are hereby corrected as shown below:

In column 2, line 14, "methylolphenols," should read --methylolphenols),--;

In column 3, line 38, "or" should read --of--;

In column 10, line 60, in Example 4, "M-5" should read --M-S--;

Signed and Sealed this

Eighth Day of August 1978

[SEAL]

Attest:

RUTH C. MASON
Attesting Officer

DONALD W. BANNER
Commissioner of Patents and Trademarks